(12) United States Patent
Hirata et al.

(10) Patent No.: US 11,148,584 B2
(45) Date of Patent: Oct. 19, 2021

(54) VEHICULAR LIGHTING APPARATUS

(71) Applicant: MAXELL, LTD., Kyoto (JP)

(72) Inventors: Koji Hirata, Osaka (JP); Masahiko Yatsu, Osaka (JP); Hiroyuki Kajikawa, Osaka (JP); Hiroyuki Nakamura, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/122,597

(22) Filed: Sep. 5, 2018

(65) Prior Publication Data

US 2019/0003673 A1    Jan. 3, 2019

Related U.S. Application Data

(63) Continuation of application No. 15/501,383, filed as application No. PCT/JP2014/076037 on Sep. 30, 2014, now Pat. No. 10,100,995.

(51) Int. Cl.
*B60Q 1/26* (2006.01)
*F21S 41/00* (2018.01)
(Continued)

(52) U.S. Cl.
CPC ............. *B60Q 1/2607* (2013.01); *B60Q 1/24* (2013.01); *B60Q 1/38* (2013.01); *F21S 41/00* (2018.01); *F21S 41/125* (2018.01); *F21S 41/13* (2018.01); *F21S 41/148* (2018.01); *F21S 41/153* (2018.01); *F21S 41/24* (2018.01); *F21S 41/285* (2018.01); *F21S 41/321* (2018.01);
(Continued)

(58) Field of Classification Search
CPC ........ F21S 6/003; F21V 21/14; F21V 23/002; F21V 23/06; F21Y 2115/10
See application file for complete search history.

(56) References Cited

U.S. PATENT DOCUMENTS 6,102,559 A * 8/2000 Nold .................... B60Q 1/0011
340/468
7,072,096 B2    7/2006 Holman et al.
(Continued)

FOREIGN PATENT DOCUMENTS

JP    2004-273180 A    9/2004
JP    2007-227356 A    9/2007
(Continued)

*Primary Examiner* — Tsion Tumebo
(74) *Attorney, Agent, or Firm* — Volpe Koenig

(57) ABSTRACT

A vehicular lighting apparatus which is relatively small, low cost, superior in mountability to an automobile, and superior in recognizeability of an object illuminated by a head lamp. The apparatus includes: a composite lens element that is a light guide element constructed by molding a translucent resin substantially into a plate-like shape; a planar light-emitting unit that emits light; an optical system that transforms planar light from the light-emitting unit into linear light and that causes the linear transformed light to be incident on a rear side face of the light guide element; and a diffraction lens formed on the rear side face of the light guide element on which the linear transformed light is incident, and condensing the linear transformed light. The light condensed by the lens means is emitted from a front side face of the light guide element onto a road surface in front of the vehicle.

10 Claims, 12 Drawing Sheets

(51) Int. Cl.
*B60Q 1/24* (2006.01)
*F21S 41/32* (2018.01)
*F21S 43/237* (2018.01)
*F21S 43/245* (2018.01)
*F21S 43/247* (2018.01)
*B60Q 1/38* (2006.01)
*F21S 41/24* (2018.01)
*F21S 41/13* (2018.01)
*F21S 41/20* (2018.01)
*G03B 21/14* (2006.01)
*F21Y 113/13* (2016.01)
*F21Y 105/10* (2016.01)
*F21Y 115/10* (2016.01)
*B60Q 1/04* (2006.01)
*F21S 41/148* (2018.01)
*F21S 41/153* (2018.01)
*F21S 41/125* (2018.01)

(52) U.S. Cl.
CPC ........... *F21S 43/237* (2018.01); *F21S 43/245* (2018.01); *F21S 43/247* (2018.01); *G03B 21/145* (2013.01); *B60Q 1/04* (2013.01); *B60Q 2400/20* (2013.01); *B60Q 2400/30* (2013.01); *F21Y 2105/10* (2016.08); *F21Y 2113/13* (2016.08); *F21Y 2115/10* (2016.08)

(56) References Cited

U.S. PATENT DOCUMENTS

| | | | | |
|---|---|---|---|---|
| 7,278,768 B2* | 10/2007 | Gasquet | ............... | B60Q 1/2607 362/539 |
| 7,600,905 B2* | 10/2009 | Geiger | ................. | B60Q 1/2665 362/494 |
| 7,946,743 B2* | 5/2011 | Natsume | .............. | B60Q 1/0041 362/509 |
| 8,251,564 B2* | 8/2012 | Lin | ...................... | G02B 6/0016 362/621 |
| 8,764,257 B2* | 7/2014 | De Lamberterie | .. | B60Q 1/2607 362/511 |
| 9,033,560 B2* | 5/2015 | Puente | .................... | F21S 41/40 362/512 |
| 9,714,754 B2 | 7/2017 | Spinger et al. | | |
| 9,958,124 B2* | 5/2018 | Izawa | ...................... | G02B 6/00 |
| 2001/0048601 A1* | 12/2001 | Emmelmann | ........ | B60Q 1/0058 362/543 |
| 2002/0071267 A1* | 6/2002 | Lekson | ................. | F21S 43/245 362/610 |
| 2004/0086223 A1* | 5/2004 | Young | .................. | G02B 6/0001 385/31 |
| 2004/0130904 A1* | 7/2004 | Yamada | ............... | B60Q 1/0058 362/487 |
| 2004/0174712 A1 | 9/2004 | Yagi | | |
| 2004/0257790 A1 | 12/2004 | Tanaka et al. | | |
| 2005/0189545 A1* | 9/2005 | Tazawa | .................... | B60Q 1/26 257/79 |
| 2007/0195540 A1 | 8/2007 | Misawa et al. | | |
| 2009/0073710 A1* | 3/2009 | Sormani | ............... | F21S 41/143 362/509 |
| 2009/0154186 A1* | 6/2009 | Natsume | ............... | F21S 43/247 362/516 |
| 2010/0008088 A1* | 1/2010 | Koizumi | .............. | B60Q 1/0058 362/235 |
| 2010/0060127 A1* | 3/2010 | Sazuka | .................... | F21S 41/13 313/1 |
| 2010/0309677 A1* | 12/2010 | Kazaoka | ............... | B60Q 1/2665 362/519 |
| 2011/0292636 A1 | 12/2011 | Fukai et al. | | |
| 2012/0020103 A1* | 1/2012 | Okada | .................. | B60Q 1/2607 362/510 |
| 2013/0021815 A1* | 1/2013 | Koizumi | ................. | F21S 43/26 362/511 |
| 2013/0027964 A1 | 1/2013 | Toyota et al. | | |
| 2013/0155379 A1 | 6/2013 | Morgenbrod et al. | | |
| 2013/0182450 A1* | 7/2013 | Buisson | ................ | F21S 43/239 362/496 |
| 2013/0208502 A1* | 8/2013 | Nakayama | ........... | G02B 6/0016 362/608 |
| 2013/0294101 A1 | 11/2013 | Brendle | | |
| 2014/0307447 A1* | 10/2014 | Ohta | ....................... | F21V 5/002 362/311.02 |
| 2014/0376245 A1* | 12/2014 | Ritter | .................... | F21S 43/249 362/511 |
| 2015/0277020 A1* | 10/2015 | Chen | .................. | G02B 27/1006 362/613 |
| 2015/0292704 A1* | 10/2015 | Koshiro | ................. | F21S 43/14 362/511 |
| 2016/0076720 A1* | 3/2016 | Nantais | ................ | B60Q 1/2607 362/511 |
| 2016/0273728 A1* | 9/2016 | Izawa | ...................... | F21S 41/28 |

FOREIGN PATENT DOCUMENTS

| | | |
|---|---|---|
| JP | 2010-182554 A | 8/2010 |
| JP | 2013-026008 A | 2/2013 |
| JP | 2013-225510 A | 10/2013 |
| WO | 2013/160823 A1 | 10/2013 |

* cited by examiner

FIG. 4
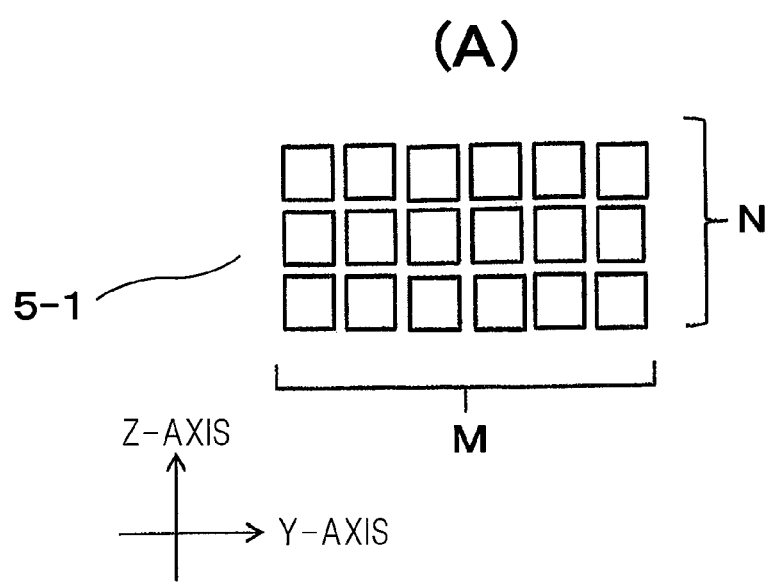
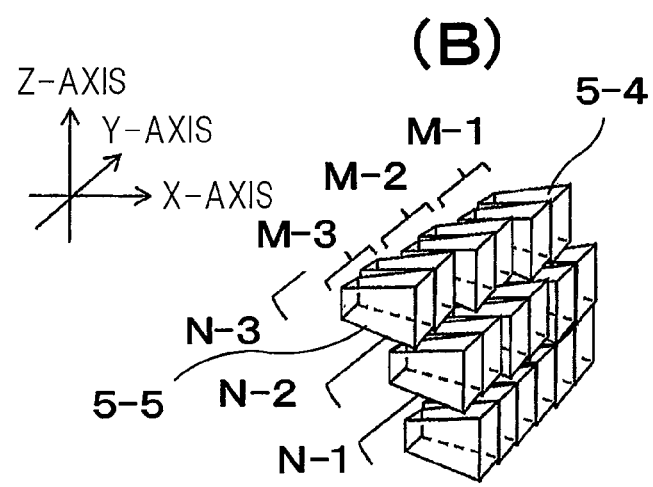

VEHICULAR LIGHTING APPARATUS

TECHNICAL FIELD

The present invention relates to a vehicular lighting apparatus which is, for example, attached to a moving body such as an automobile and which emits light onto a road surface when the automobile is running during the night or in such a dark place as tunnel, and particularly relates to a vehicular lighting apparatus which utilizes, as a light source, a solid-state light-emitting element typified by an LED.

BACKGROUND ART

The solid-state light-emitting element typified by an LED has been developed remarkably in recent years. For example, already known in Patent Document 1 has been a vehicular lighting apparatus that is different from a head lamp, but utilizes, to a part of a rear combination lamp attached to a rear side of a vehicle, the LED as its light source.

Then, in Patent Document 2, it has also been already known that a vehicular lighting apparatus has a structure suitable for being used as a head lamp in place of a conventional halogen lamp and utilizes an LED source.

RELATED ART DOCUMENTS

Patent Documents

Patent Document 1: Japanese Patent Application Laid-open No. 2007-227356
Patent Document 2: Japanese Patent Application Laid-open No. 2010-182554

SUMMARY OF THE INVENTION

Problems to be Solved by the Invention

However, the above vehicular lighting apparatuses as conventional techniques have problems. Particularly, it is difficult to use the vehicular lighting apparatus of the former Patent Document 1 as the head lamp attached to a front side of the vehicle. The vehicular lighting apparatus of the latter Patent Document 2 utilizes, as its light source, an LED light source in place of the conventional halogen lamp. This does not necessarily offer a specific advantage over the head lamp provided by the conventional technique.

Namely, in the conventional head lamp attached to the front side of the vehicle, the halogen lamp serving as its light source has a light emission point shape which is small and almost spherical. Therefore, to effectively capture and use all generated beams of emitted light, the substantially overall shape or partial shape of the head lamp is similar to the shape of the halogen lamp. This has been one of important components for a design constituting a front of the vehicle.

Recently, however, has been seen the advent of such vehicles as hybrid cars and electric cars that are equipped with power sources different from internal-combustion engines. These vehicles have ushered in a new field. Together with this, a degree of freedom also in automobile design drafts has been demanded including drafts of the head lamps of the automobiles.

In the head lamp using an LED light source, a white LED with high light emission efficiency for illumination is used as the LED light source. This white LED uses a combination system of a blue LED and a fluorescent material, and the system is caused to emit yellow light by arranging the fluorescent material on a light emission surface for emitting blue light, and to create white light by mixing the yellow light and the blue light.

The white LED has high light emission efficiency, operates in an energy-saving manner, and is inexpensive, but has a low energy intensity in a red light range near a light wavelength of 660 nm, thus showing a tendency in which a red part of an object illuminated by the white LED is difficult to see. A red color is used as a color indicating a dangerous situation. It is therefore desirable that the red part of the object is easily seen by the illuminated light from the head lamp of the vehicle.

Accordingly, the present invention is achieved in view of the problems posed by the above conventional techniques. It is specifically an object of the invention to provide a vehicular lighting apparatus which uses the solid-state light source as the head lamp in place of the conventional halogen lamp and simultaneously makes the most of its characteristics, and which particularly has a structure superior in a design property.

Means for Solving the Problems

According to the present invention, to achieve the above object, provided is a vehicular lighting apparatus that can be attached to a front end part of a vehicle, and that comprises: a light guide element constructed by molding a translucent resin into a substantially plate-like shape; a planar light-emitting unit that emits illumination light; an optical system that transforms planar light from the light-emitting unit into liner light and that causes the liner light to be incident on one side face of the light guide element; and a lens means formed on the one side face of the light guide element on which the transformed liner light is incident, the lens means condensing or diffusing the liner light, wherein the light condensed and diffused by the lens means is emitted, onto a road surface in front of the vehicle, from the other side face opposite to the one side face of the light guide element, and the light-emitting unit emits white light including red light.

Effects of the Invention

According to the present invention described above, use of the solid-state light source as the head lamp brings provision of a vehicular lighting apparatus which: is relatively small; can be manufactured at low cost; is superior in mountability to the automobile since a red part of an illuminated object is visually recognized easily; and has the structure superior in the design property. Thus, the vehicular lighting apparatus extremely useful in practical applications is provided.

BRIEF DESCRIPTIONS OF THE DRAWINGS

FIG. 4 is a view showing a detailed configuration of a planar light source of the above vehicular lighting apparatus;

DETAILED DESCRIPTION OF PREFERRED EMBODIMENTS

Hereinafter, a vehicular lighting apparatus that is an embodiment according to the present invention will be detailed in reference to the accompanying drawings.

Figure 1:
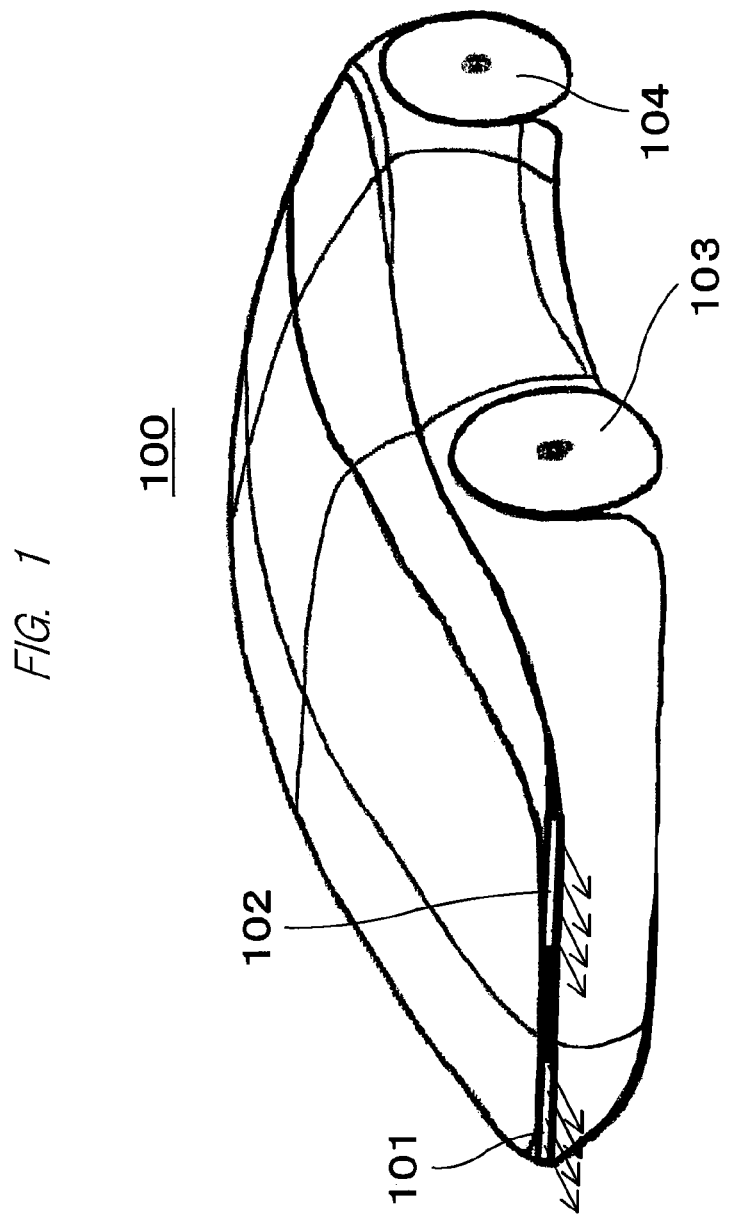
FIG. 1 is an exterior view of an automobile equipped, as a head lamp, with a vehicular lighting apparatus that is an embodiment according to the present invention.

Firstly, FIG. 1 shows an exterior view of an automobile equipped with a vehicular lighting apparatus of the present invention as its head lamp. In FIG. 1, namely, to reduce air resistance during traveling of the automobile, an automobile body 100 is molded into a so-called streamline shape. A right composite light 101 and a left composite light 102 are attached to both sides of a front of the automobile body 100, respectively. In FIG. 1, reference numeral 103 denotes a front wheel of the automobile and reference numeral 104 denotes a rear wheel of the automobile.

FIG. 1 clearly shows that the left and right composite lights 101 and 102, i.e., the vehicular lighting apparatus of the present invention, are each attached linearly to a front end part of the automobile body 100. The vehicular lighting apparatus having such an exterior shape, in comparison with a conventional vehicular lighting apparatus having a halogen lamp etc., can be attached freely to the front end part of the vehicle without disturbing the streamline shape of the automobile body. This widely improves a degree of freedom in automobile draft including its head lamp.

Secondly, hereinafter will be explained the above-mentioned head lamp that is the vehicular lighting apparatus of the present invention, i.e., specifically, a detailed structure of the composite light 101 shown on a left side in the exterior view of the automobile of FIG. 1.

Figure 2:
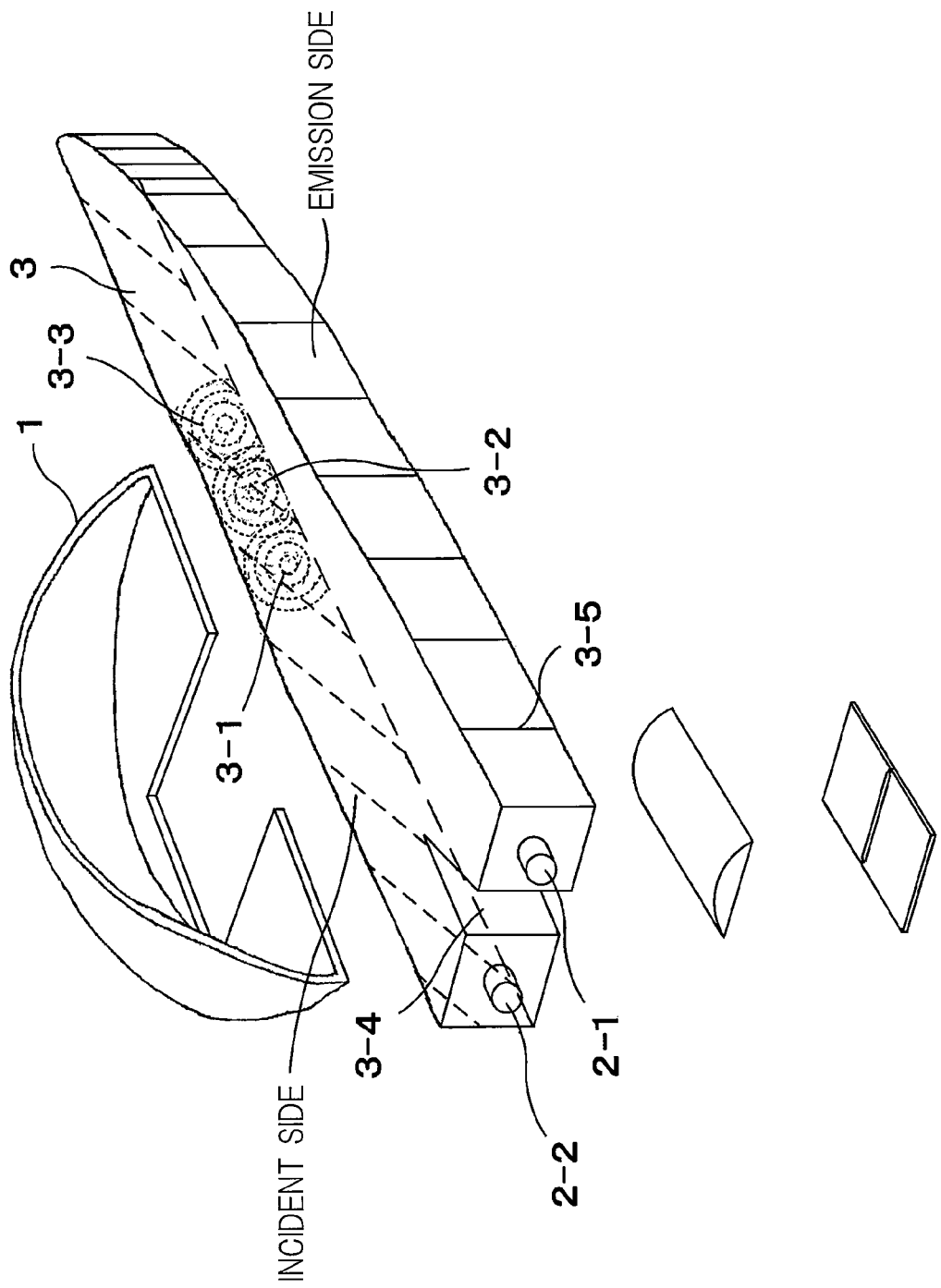
FIG. 2 is a development perspective view of an overall configuration of a composite light that is the above vehicular lighting apparatus.
Figure 3:
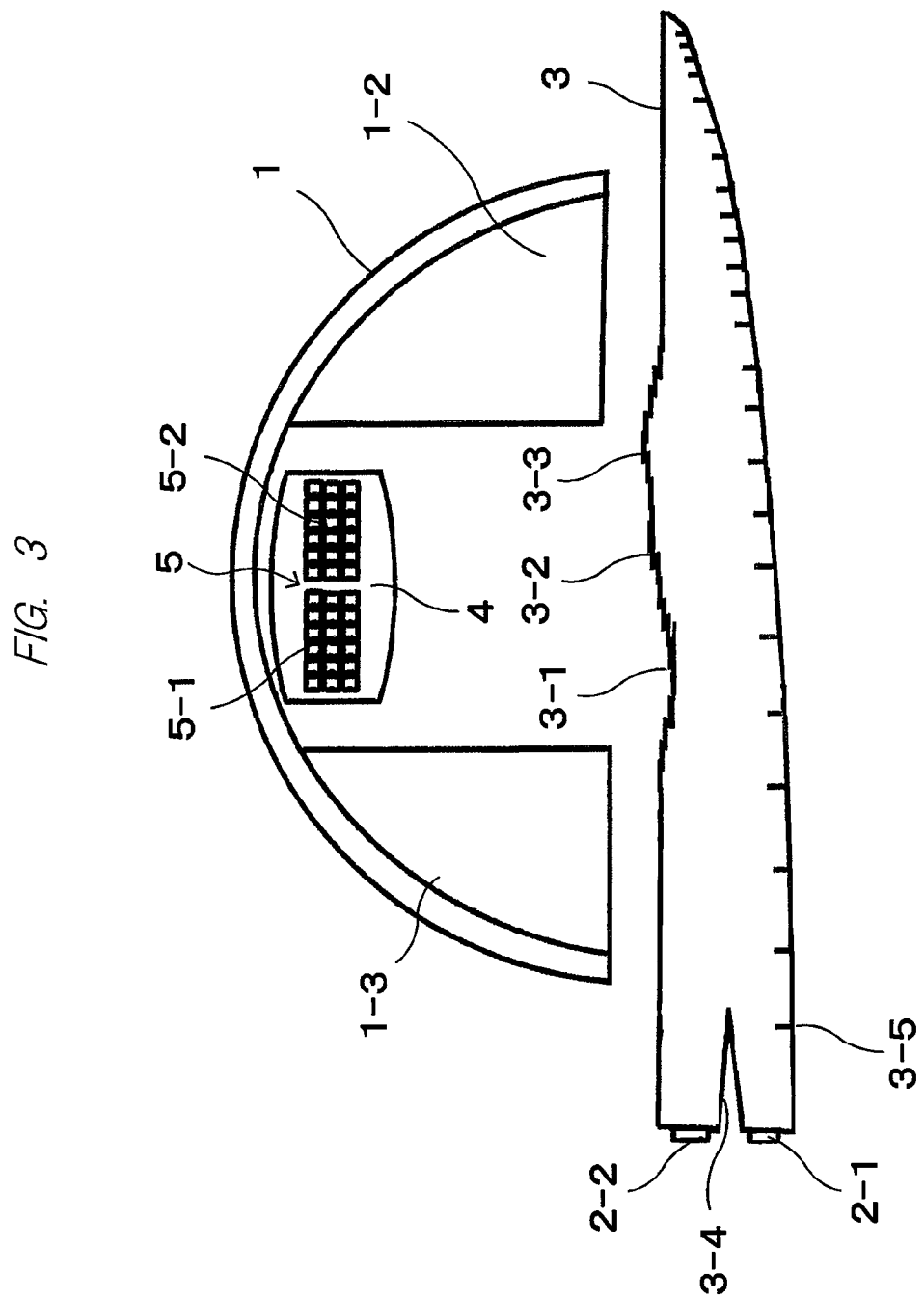
FIG. 3 is a top view showing an overall configuration of the above vehicular lighting apparatus.

FIG. 2 is a development perspective view of an overall configuration of the above composite light 101, and FIG. 3 is a top view of the composite light 101. FIGS. 2 and 3 clearly show that the composite light 101 has a composite lens element 3 which is, for example, a flat bar-like or plate-like light guide element molded by die-molding a translucent resin such as acryl. An outline of the light guide element is formed into a long and narrow shape with one side face tapered (substantially an isosceles triangle).

In this example, a plurality of (two in this example) light sources 2-1 and 2-2, which are composed of respective individual LEDs and emit beams of light different in color, are attached to one end face (left end face in this example) in the longitudinal direction of the composite lens element 3 that is the above flat light guide element. The above end of the composite lens element 3 has a "V-shaped" groove formed for separating beams of light. As a result, two inner surfaces of the light guide element that are counter to the "V-shaped" groove each function as a light reflection surface (surface 3-4 in FIG. 2). In this example, a white LED that emits white light is used as one solid-state light source 2-1, and a yellow LED that emits yellow light is used as the other solid-state light source 2-2.

As clearly shown also by FIG. 3, the composite lens element 3 as the flat light guide element has side faces (a front side face and a rear side face in FIG. 3) extending along its longitudinal direction. Light from the above light sources 2-1 and 2-2 as well as light from a different light source described later are emitted from the front side face toward the front of the vehicle. On its rear side face, a reflection mirror 1 described below is disposed. Reference numeral 1-2 in FIG. 3 denotes ends (reflection mirror ends) formed on both sides for locating the reflection mirror 1.

On the front side face of the composite lens element 3 are formed a plurality of so-called light diffusion portions 3-5 which are, for example, vertically extending grooves each having a substantially "V-shaped" section. These light diffusion portions 3-5 as the grooves are formed on the front side face of the composite lens element 3. The portions are arranged relatively sparsely (with larger inter-groove distance) in the vicinity of ends to which the light sources 2-1 and 2-2 are attached, and are arranged relatively densely (with smaller inter-groove distance) in the vicinity of the other end opposite to the above ends. The light diffusion portions 3-5 are not always limited to be the above vertical grooves, but may uniformly diffuse light as a whole, and may be, for example, dot-like grooves, dot-like projections, and vertical projections as other shapes.

Under the reflection mirror 1, a planer light source (light-emitting unit) 5 that emits white light with a high intensity is disposed in place of the conventional halogen lamp etc., and a lens 4 is provided between the planer light source 5 and the reflection mirror 1. In this example, although describe later as one example, the planer light source 5 with a high light emission intensity is constructed by arranging a plurality of (two in this example) composite light sources 5-1 and 5-2 each having a plurality of LEDs. For example, a lenticular lens with a substantially columnar outline is used as the lens 4 in order to condense planar light into linear light and to change the shape of a beam of light. The lens 4 is disposed above the planar light source 5 in such a way as to almost cover the whole of its light emission surface. The lens 4 for condensing the beam of light from the composite light source (planar light source) 5 or changing the shape of the beam may have a toroidal, aspherical, or free-curved surface shape besides the lenticular lens.

The reflection mirror 1, as seen apparently also from the above Figure, has a curved reflection surface with, for example, a spherical or aspherical, parabolic, or free-curved surface shape. The reflection mirror 1: reflects and condenses, on its reflection surface, light which has been emitted from the planar light source 5 and transformed into substantially linear light through the lens 4; and guides the reflected light to an incident surface that is a rear side face of the composite lens element 3.

Provided on the rear side face extending in the longitudinal direction of the composite lens element 3 and used as the incident surface of the composite lens element 3 is an optical means which transforms the light reflected from the reflection mirror 1 into a given shape to create a desired illumination area (light distribution) on a road surface in front of the vehicle. For example, such an optical means may be formed as a lens surface of a Fresnel lens etc. or as a diffraction grating (brazed diffraction grating). Forming the Fresnel lens or diffraction grating allows avoiding an increase in thickness or outline of the composite lens element 3, and is therefore particularly preferable. In this example, a plurality of (three in this example) diffraction gratings 3-1, 3-2, and 3-3 are formed as indicated by broken lines in FIG. 2. The diffraction gratings 3-1, 3-2, and 3-3 are formed such that the diffraction grating 3-2 at a center overlaps the diffraction gratings 3-1 and 3-3 on its both sides.

FIG. 4(A) depicts a detail of the composite light source 5-1 out of the plurality of (two in this example) composite light sources 5-1 and 5-2 making up the above planar light source 5. In this Figure, the composite light source 5-1 is composed of a plurality of (M×N=6×3 in FIG. 4(A)) high output power LED elements (semiconductor light-emitting elements) arranged in a matrix formation on a plane (Y-Z axes). These plural LED elements can be driven separately by control lines (not depicted) etc. A size of each LED element is, for example, 0.2 mm×0.2 mm, and a distance between the respective LED elements is 0.04 mm.

FIG. 4(B) depicts so-called light guides 5-4, which are arranged close to the light emission surfaces of the M×N LED elements. Each light guide 5-4 has one opening (left-hand side in Figure) serving as a unit light source 5-5 and the other opening (right-hand side in Figure) left opened to illuminate light from the unit light source 5-5 as a beam of light with desired light distribution characteristics. These light guides 5-4 may be, for example, formed into quadrangular pyramids, as shown in Figure, or into cones. The light guides 5-4 each have a function of reflecting light from the LED light-emitting elements arranged counter to each other and transforming the reflected light into a beam of light of a given shape, especially into a beam of light with a smaller diffusion angle; and allow a light emission point to be set in a height direction. By arranging the light guides 5-4 three-dimensionally (along the X-axis, Y-axis, and Z-axis) with various heights, it is therefore possible to properly adjust the position of the light emission point of light from the planar light source 5. The planar light source having the above structure is thus particularly advantageous for a case of determining the light distribution of illumination provided by the light that is condensed or diffused through the diffraction gratings 3-1, 3-2, and 3-3 formed on the rear side face of the composite lens element 3 and that is emitted out of the front side face of the composite lens element 3.

Figure 12:
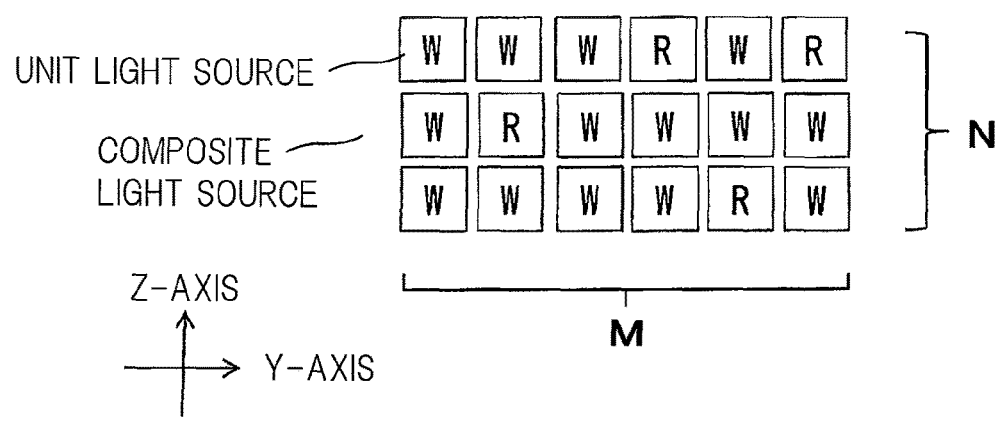
FIG. 12 is an explanatory view about a type of unit light sources of the vehicular lighting apparatus.

A configuration of a unit light source 5-5 will then be described. FIG. 12 depicts a planar light-emitting unit formed planarly by arranging two types of high output power LED elements used as unit light sources W and R on a plane (Y-Z axes) and in a square manner of 6×3 pieces. The few unit light sources R are placed partially among the many unit light sources W formed in the square manner.

Figure 13:
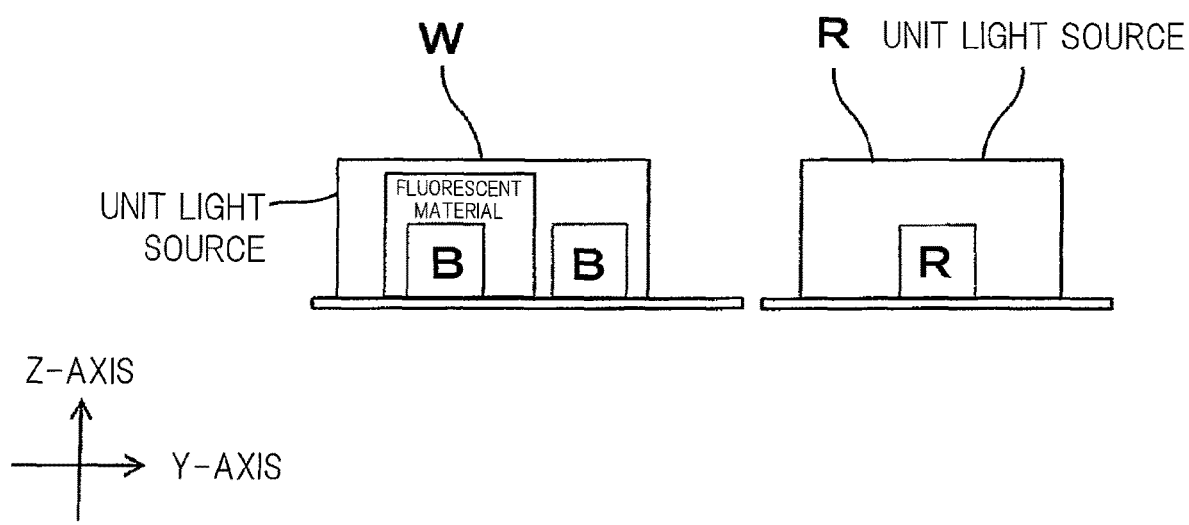
FIG. 13 is a detailed explanatory view about the unit light sources of the vehicular lighting apparatus.

Each unit light source W is a white light-emitting LED. As shown in FIG. 13, two blue LED elements are juxtaposed on a substrate; one of them is overlaid with a fluorescent material, which emits yellow light using emitted light from a blue LED element as excitation light, to cause the fluorescent material to emit the yellow light; and the yellow light is synthesized (mixed) with the emitted light from the blue LED element to create white light. Or, the above yellow light is mixed with blue light emitted from the other blue LED element to create white light. Each unit light source R is a red LED that emits red light. As shown in FIG. 13, the unit light source R is constructed by disposing an LED element on the substrate.

Red light includes red visible rays and, depending on applications, may include near-infrared rays and infrared rays besides the red visible rays. In the same manner as in the above-described white light, the emitted light from the blue LED element is used as excitation light, and is used with a fluorescent material that emits red light, near-infrared rays, or infrared rays to obtain desired red light.

It is also possible that: green light is emitted temporarily by using the emitted light from the blue LED element as excitation light; the fluorescent material that emits red light, near-infrared rays, or infrared rays is excited with the emitted green light serving as second excitation light; and red light (which is indicated as a red light-emitting LED in FIG. 13) is obtained.

According to the above configuration, although the unit light sources R emit red light, light quantity of white light is larger than that of red light in terms of total light quantity of the composite light source. The composite light source as a whole, therefore, emits white light. However, color temperature of light can be controlled, for example, in such a way that to improve visibility in a misted environment, light emission quantity of red light is increased as the color temperature of white light is lowered.

Figure 14:
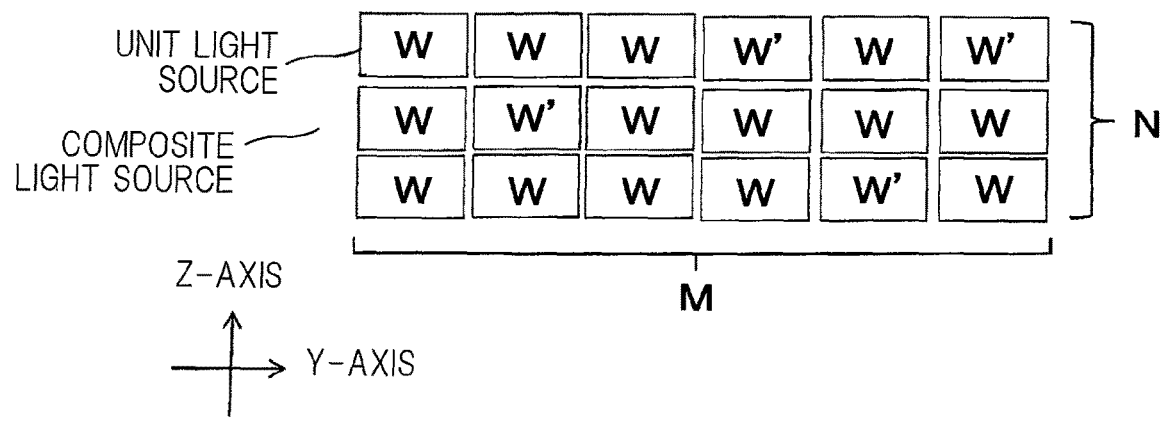
FIG. 14 is an explanatory view about another type of unit light sources of vehicular lighting apparatus.

An example of another configuration of the unit light source 5-5 will be described. FIG. 14 depicts the light-emitting unit formed by arranging two types of high output power LED elements used as unit light sources W and W' on a plane (Y-Z axes) and in a square manner of 3×6 pieces, and the unit light sources W' are used in place of the unit light sources R of FIG. 12. The unit light sources W are the same white light-emitting LEDs as shown in FIG. 13.

Figure 15:
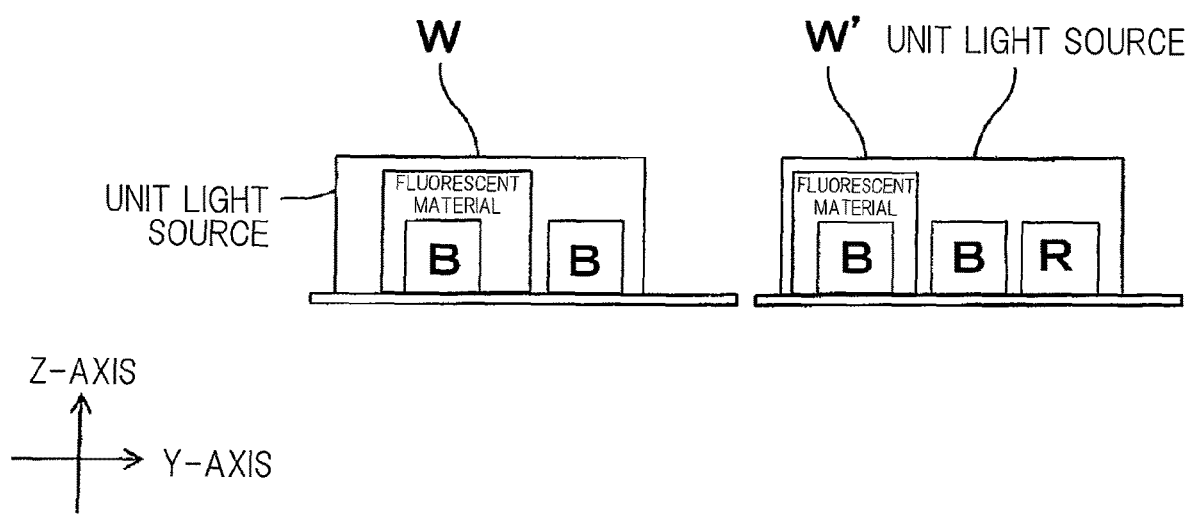
FIG. 15 is a detailed explanatory view about other unit light sources of the vehicular lighting apparatus.

Each unit light source W', as shown in FIG. 15, is arranged on a substrate by adding a red LED element to a configuration of the unit light source W. An array ratio of the unit light sources W to the unit light sources W' is the same as that shown in FIG. 12.

According to the above configuration, although the unit light sources W' emit the reddish white light, since the light quantity of white light is remarkably more in the total light quantity of the composite light source, white light is emitted.

In each of the above cases of FIGS. 12 to 15, when white light to be illuminated is emitted from the head lamp of the vehicle, a red light component included in the emitted white light is reflected on a red part of an illuminated object. The red part of the illuminated object is, therefore, can be visually recognized easily.

Too many unit light sources R lead to emission of reddish light, resulting in lower brightness. Fewer unit light sources R are, therefore, preferable if the fewer unit light sources R still allow easy visual recognition of the red part of the illuminated object.

Figure 16:
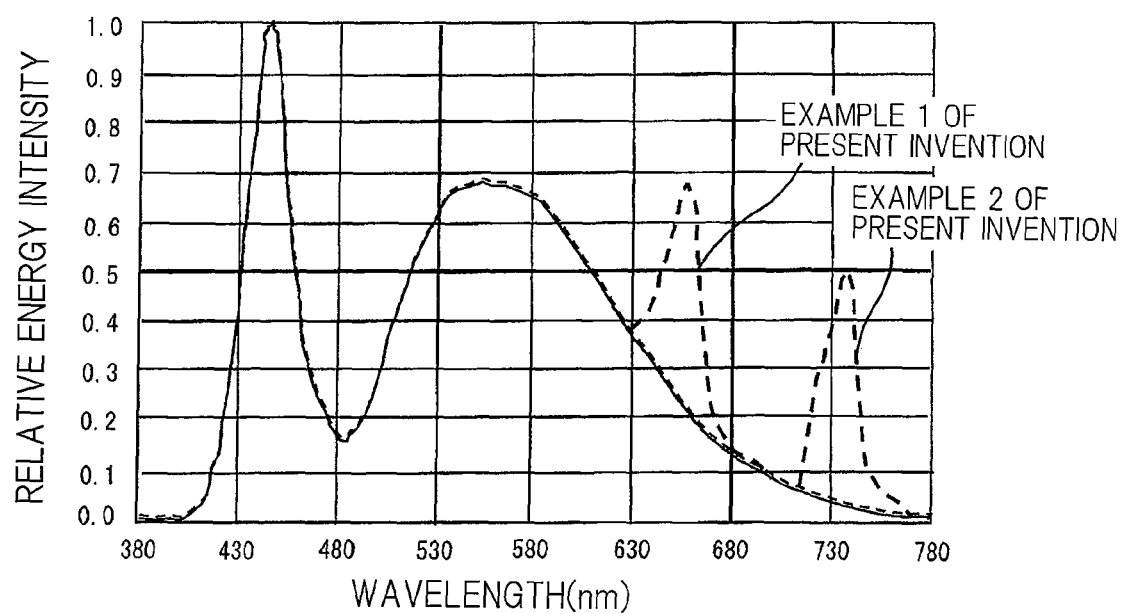
FIG. 16 is a characteristic view for explaining a spectral energy distribution of the planar light source of the vehicular lighting apparatus.

FIG. 16 depicts a distribution of the spectral energy of the light-emitting LED. In FIG. 16, a solid line represents a distribution of the spectral energy of a conventional white light-emitting LED composed of a combination system of a blue LED and a fluorescent material. The spectral energy distribution represented by the solid line demonstrates that a relative energy intensity drops significantly near the red light range (near a light wavelength of 660 nm), showing a tendency in which the red part of the object is difficult to see.

According to the embodiment depicted in FIGS. 12 to 15, in contrast, the relative energy intensity rises significantly near the red light range (near the light wavelength of 660 nm), as indicated by a broken line representing a spectral energy distribution of Example 1 according to the present invention in FIG. 16. This spectral energy distribution represented by the broken line demonstrates a tendency in which the red part of the object is seen easily.

According to the example described above, the red light-emitting LED is structured to emit visible red light, but may be structured to emit infrared and near-infrared rays selectively or simultaneously. In such a case, each of the light-emitting units depicted in FIGS. 13 and 15; is provided with a new unit light source having an infrared LED element that emits infrared or near-infrared rays; and is configured to be added partially in the square array. In this configuration, the added infrared LED element is connected to a power line such that light is emitted under drive control independent of other LED elements.

A spectral energy distribution resulting from light emission by the infrared LED element is indicated by another broken line representing a spectral energy distribution of Example 2 according to the present invention in FIG. 16. Namely, this spectral energy distribution demonstrates that the relative energy intensity rises significantly in an area of light wavelengths longer than light wavelengths near the red light range (near the light wavelength of 660 nm). Although detailed later, the present invention offers a spectral energy distribution characterized in that the relative energy intensity rises significantly also in an area near the near-infrared or infrared range (not depicted) including wavelengths of 850 nm or longer.

The near-infrared or infrared LED element stops emitting light during normal time, and is utilized selectively to emit the light when an infrared/near-infrared operated camera is used. Namely, the near-infrared or infrared LED element is used as a system that at nighttime, emits a low beam of white light and illuminates infrared rays toward an oncoming car, and that causes the above camera to highly sensitively capture the reflected infrared rays for monitoring, thereby avoiding dazzling a driver of the oncoming car and accurately recognizes a walker who is hardly visible under the influence of the head light of the oncoming car.

The above embodiment is described as the composite light source composed of M×N=6×3 high output power LED elements (semiconductor light-emitting elements) as an example. Each light-emitting element, however, may be composed of an array of more minute light-emitting elements. In short, the light-emitting element may be a planar light source that offers the desired light emission intensity.

Functions and operations of the vehicular lighting apparatus according to the present invention having the above configuration, in particular, those of a head lamp will hereinafter be described.

<Running Lamp Function>

This is a so-called daytime running lamp (DRL) function of causing a part of the head light of the automobile to emit a linear beam of light during traveling of the vehicle.

Figure 5:
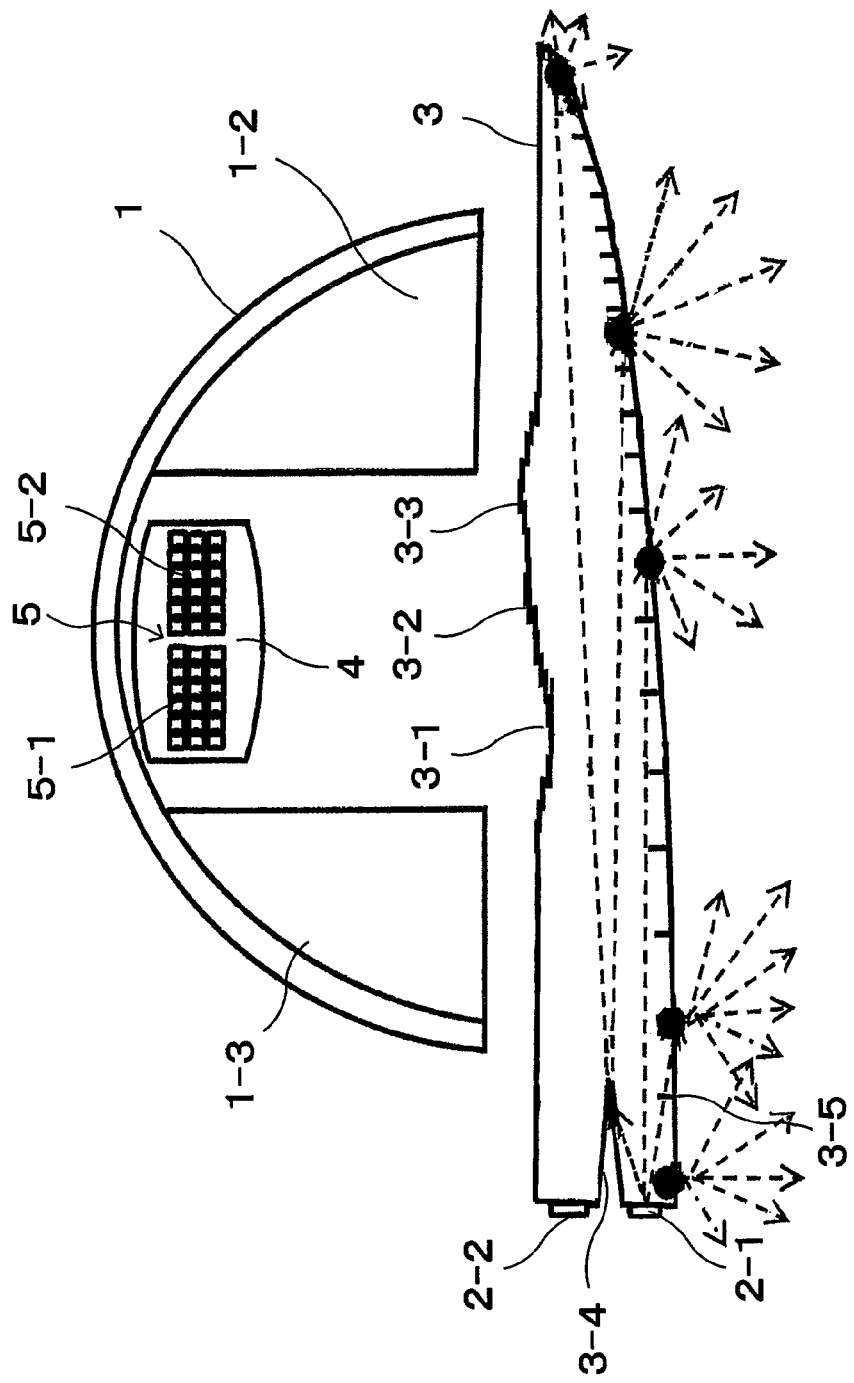
FIG. 5 is a view for explaining a light emission operation when the above vehicular lighting apparatus functions as a running lamp.

When the running lamp function is exerted, the one light source 2-1 attached to an end face (left end face in Figure) of the composite lens element 3 making up the head lamp is caused to emit light, as shown in FIG. 5. (White) light emitted out of the light source 2-1: propagates through an interior of the flat, bar-like light guide element formed substantially into an isosceles triangle, the light guide element making up the composite lens element 3; and outwardly comes out of the composite lens element 3 in almost the whole area in the longitudinal direction of the front side face of the composite lens element 3 serving as a light emission surface, via the light diffusion portions 3-5 etc. as indicated by dotted line arrows in Figure. As a result, the DRL function of causing the part of the head light of the automobile to emit the linear beam of light during traveling of the vehicle is performed as indicated by the reference numerals 101 and 102 in FIG. 1.

<Direction Indicator Lamp Function>

This is a so-called turn signal lamp function of causing a part of the head light to emit light for indicating the traveling direction of the automobile.

Figure 6:
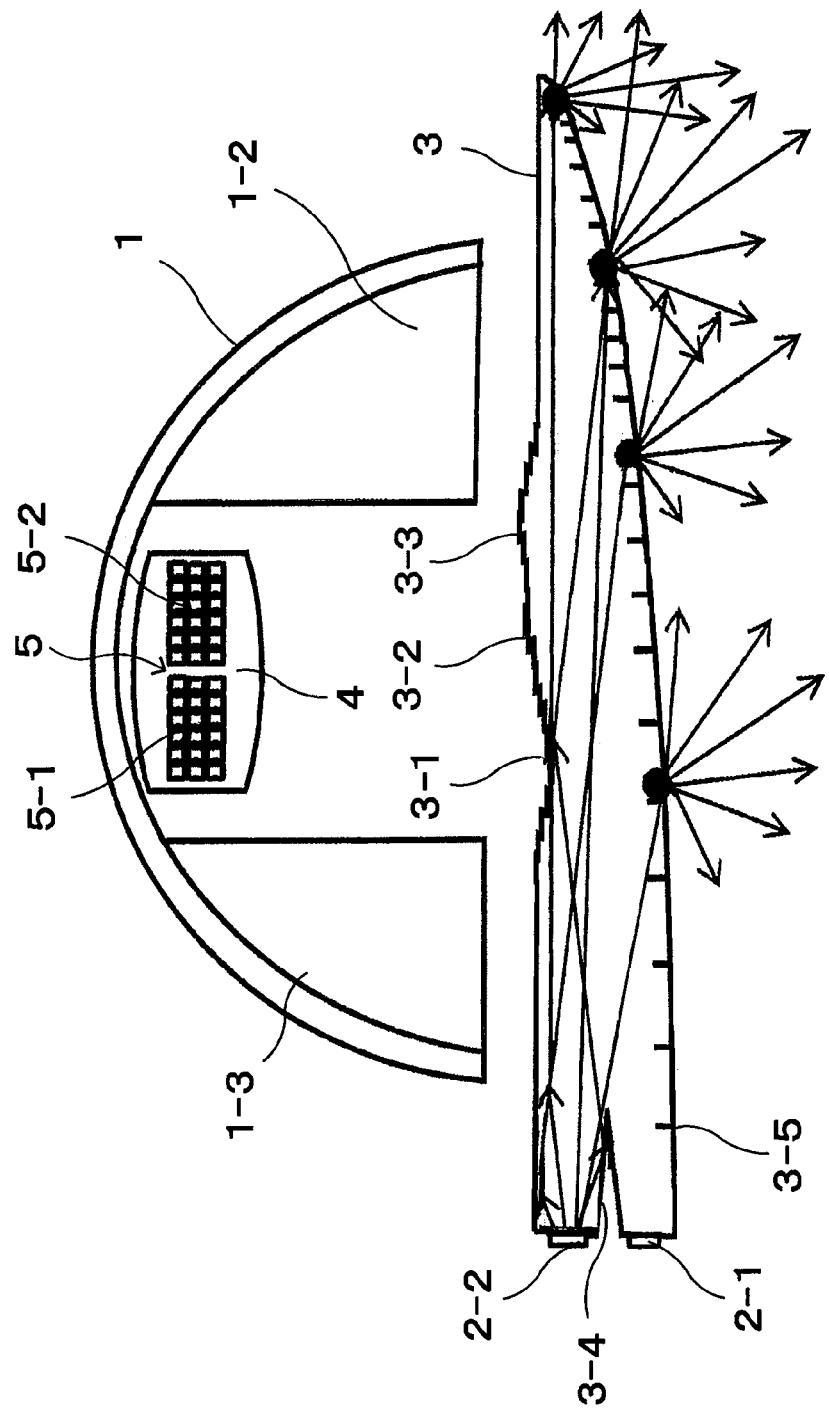
FIG. 6 is a view for explaining a light emission operation when the above vehicular lighting apparatus functions as a direction indication lamp.
Figure 7:
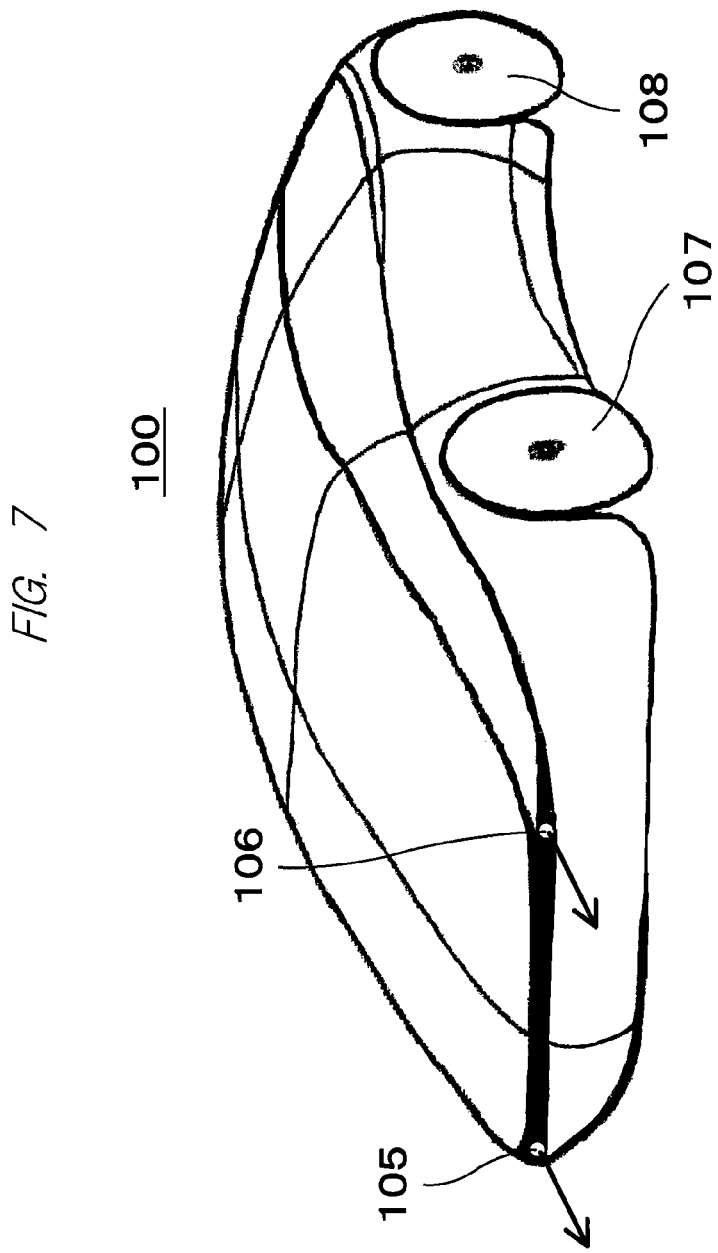
FIG. 7 is a view showing an automobile appearance while the above vehicular lighting apparatus lights up as the direction indication lamp.

When the direction indicator lamp function is exerted, the other light source 2-2 attached to the end face (left end face in Figure) of the composite lens element 3 making up the above head lamp is caused to emit light, as shown in FIG. 6. (Yellow) light emitted out of the light source 2-2: propagates through the interior of the flat, bar-like light guide element formed substantially into an isosceles triangle, the light guide element making up the composite lens element 3; and outwardly comes out of the composite lens element 3 via the light diffusion portions 3-5 formed densely near the other end face (right end face in Figure) of the composite lens element 3, as indicated by solid line arrows in Figure. As a result, the direction indicator lamp function of causing the head light of the automobile to light up at both ends of the head light for indicating the traveling direction of the vehicle is performed, as indicated by reference numerals 105 and 106 in FIG. 7.

The beam of (white) light emitted from the light source 2-1 for the above running lamp function and the beam of (yellow) light emitted from the light source 2-2 for the direction indicator lamp function are separated by an operation of light reflection surfaces 3-4 due to a "V-shaped" groove formed on the end of the composite lens element 3. This prevents both beams of light from mixing with each other inside the light guide element of the composite lens element 3.

<Head Lamp Function>

This is a major function of the head lamp, that is, a function of emitting illumination light onto the road surface on which the automobile travels.

Figure 8:
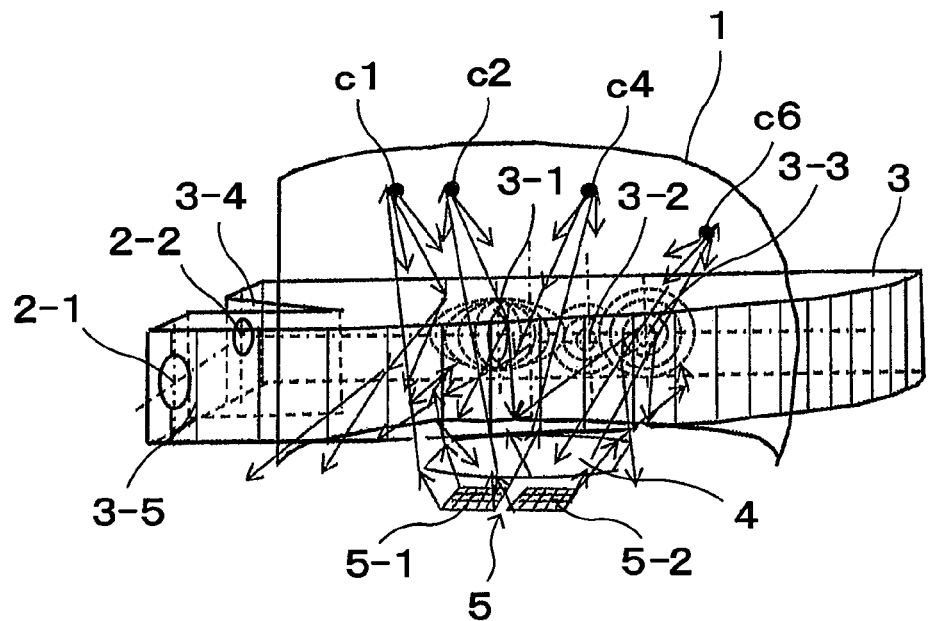
FIG. 8 is a perspective view for explaining a light emission operation when the above vehicular lighting apparatus functions as a head lamp.
Figure 9:
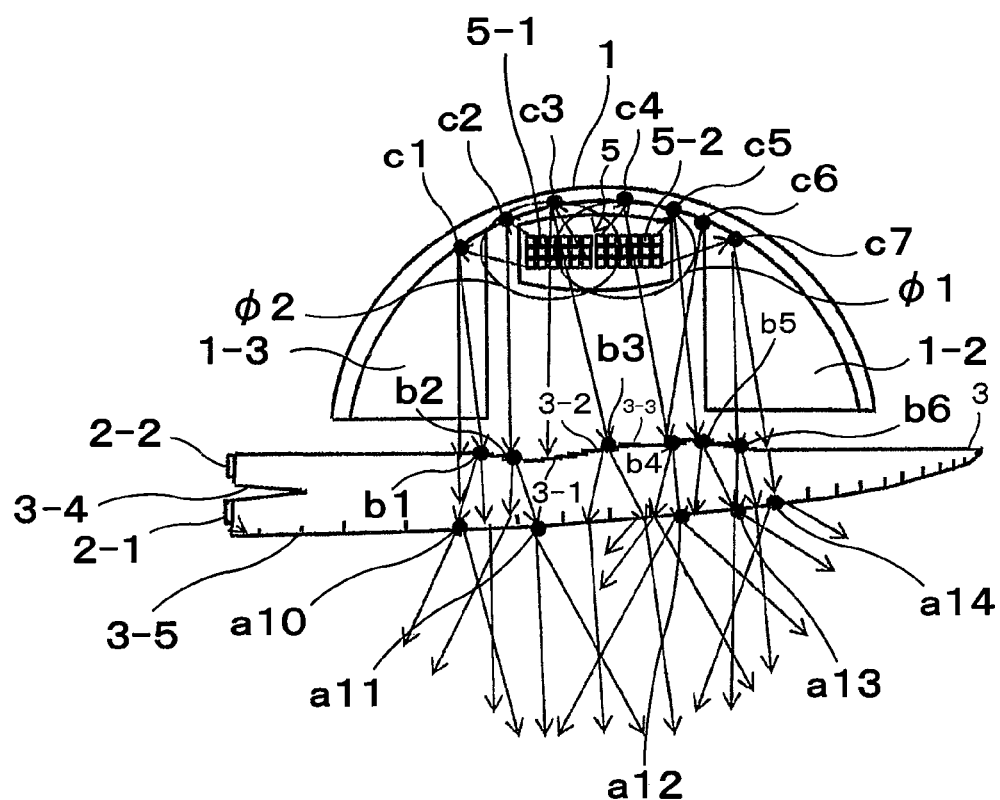
FIG. 9 is a top view for explaining a light emission operation when the above vehicular lighting apparatus functions as the head lamp.

In this case, as indicated by arrows in FIGS. 8 and 9, light with a high intensity from the planar light source 5 (i.e., two composite light sources 5-1 and 5-2) is guided into the light guide element used as the composite lens element 3 via the lens 4 and the reflection mirror 1 (see reflection points c1 to c6 in FIG. 8). The beams of light: are thus condensed by optical means (see diffraction gratings 3-1, 3-2, and 3-3 in this example and reference numerals b1 to b6 in FIG. 9) formed on the rear side face used as an incident surface of the light guide element; then come out of an emission surface used as the front side face of the light guide element; and are diffused by the optical diffusion portions 3-5 formed on the emission surface and are emitted in front of the vehicle. In this manner, according to the vehicular lighting apparatus of the present invention, the light distribution characteristics of the beams of light emitted out of the planar light source 5 are controlled through the lens 4, the reflection mirror 1, and the optical means formed on the composite lens element 3. In this case, the beams of light are illuminated as light with superior light distribution characteristics, by forming the surface of the reflection mirror 1 not into a mirror surface but into a surface defining a fine optical pattern for controlling the light distribution characteristics.

Then, a light emission area and a light emission intensity of the planar light source 5 are controlled to obtain the desired light distribution characteristics, as described below.

A case in which illuminated light from the composite lens element 3 is switched between so-called high beam emission and low beam emission will first be described. In this case, for example, the plurality of light-emitting elements making up the planar light source 5 are driven selectively. More specifically, for example, the light-emitting elements located near a line-directional planar light source 5 among the light-emitting elements making up the planar light source 5 (two composite light sources 5-1 and 5-2 each having the configuration shown in FIG. 4(A)) are caused to emit light of: the light-emitting elements located correspondingly on an upper line in order to produce the high beam; and the light-emitting elements located correspondingly on a lower line in order to produce a low beam. To produce a wide low beam, the light-emitting elements driven by the planar light source 5 may be increased in its line direction.

For example, if the two composite light sources 5-1 and 5-2 making up the planar light source 5 are switched selectively (when the light source 5 is a single sheet of planar element, its left and right areas are switched), the light illuminated in front of the vehicle from the front side face of the composite lens element 3 used as the light guide element can be moved left and right. In other words, a light emission area (pattern) of the planar light source 5 is changed to obtain a desired light distribution pattern.

Figure 10:
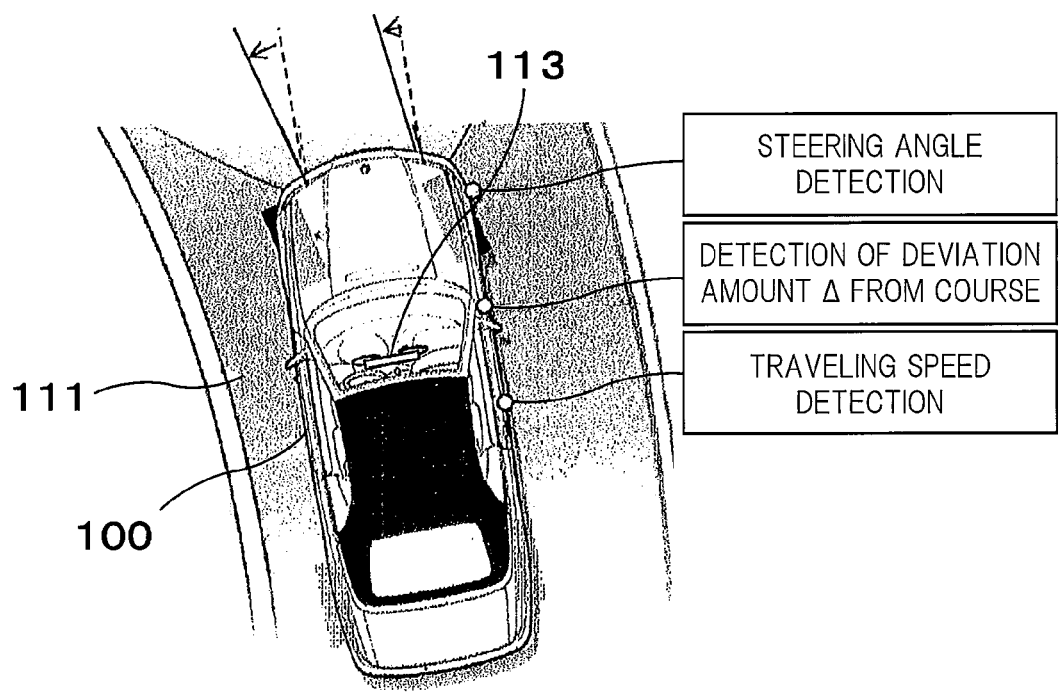
FIG. 10 is a view for explaining a light distribution characteristic of illumination light according to the above vehicular lighting apparatus.
Figure 11:
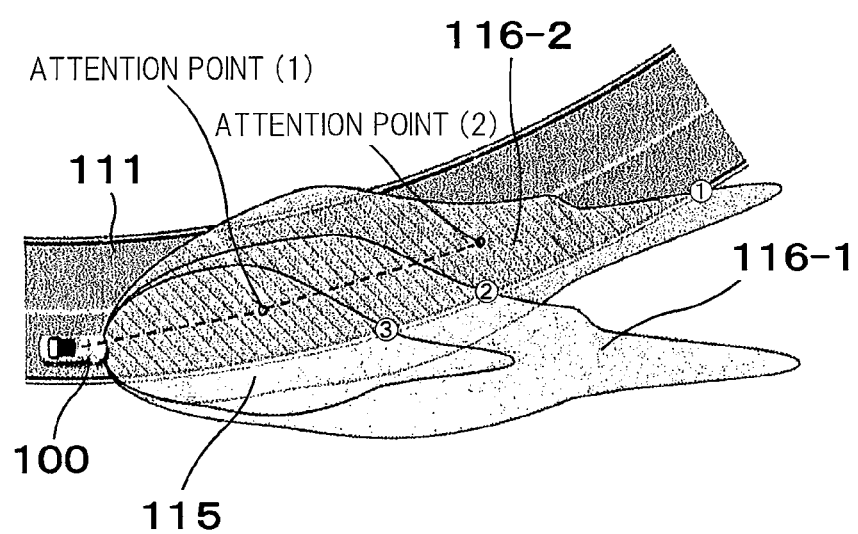
FIG. 11 is a view for explaining a light distribution characteristic of illumination light according to the above vehicular lighting apparatus.

This achieves a function of selecting one of the above high beam, low beam, and wide low beam, as well as a function of automatically directing a beam of light from the head light in the direction of travel of the vehicle, based on signals detected by a steering angle detecting means, a detecting means for a deviation amount Δ from a course, and a traveling speed detecting means which are mounted to the automobile body 100 (not detailed herein), as shown in FIGS. 10 and 11. Through achievement of these functions, a so-called adaptive head light can be realized. In FIG. 10, reference numeral 111 denotes a road on which the automobile body 100 travels, and reference numeral 113 denotes a means for detecting a front view, such as a CCD camera, which is attached to the automobile.

FIG. 11 depicts an illumination characteristic obtained from the vehicular lighting apparatus (head light) according to the present invention. This shows a state of change from an ordinary low beam 115 or high beam 116-1 into a high beam 116-2 moving along a steering direction of the vehicle when the straight running vehicle approaches a corner. Namely, an attention point (1) and an attention point (2) lying in front of the vehicle as shown in Figure, and also the attention point (2) that cannot be detected only by the ordinary low beam 115 or high beam 116-1 can be detected by the high beam 116-2 that moves along the steering direction. This allows assisting in performing safer driving.

In addition, a light distribution pattern that enables the safer driving can be obtained also by changing the light emission area (pattern) of the planar light source 5, based on a detection signal transmitted from the means for detecting a front view such as the CCD camera. For example, when the vehicle detects an oncoming car in its front view, the vehicle turns off the light-emitting elements in an area of the beams of light emitted toward the oncoming car or reduces the light emission intensity of the light-emitting elements; or shifts the light distribution direction of light from the head lamp. Therefore, it is also possible to avoid dazzling occurrence to the oncoming car by the light emitted out of the head lamp.

The embodiment of the present invention has been described above in detail. The embodiment can achieve the superior vehicular lighting apparatus which, as clearly indicated by its exterior shape, is relatively small; can be attached freely to the front end part of the vehicle; allows a significant improvement in a degree of freedom in drafting the vehicle including its head lamp; and, by an integral configuration including the running lamp and direction indicator lamp, can reduce manufacturing costs and simplify assembling work of assembling the lighting apparatus into the vehicle body.

The embodiment of applying the vehicular lighting apparatus of the present invention, particularly, to the head lamp has been described above in detail. The present invention is, however, not limited to this embodiment and, for example, may be used as a tail lamp attached to the rear of the vehicle body. When the vehicular lighting apparatus is used as a brake lamp, in particular, the planar light source with a high light emission intensity and the reflection mirror are unnecessary. Therefore, the vehicular lighting apparatus can be achieved with a simple structure and at a low price. In this case, red LEDs that emit red light may be preferably used as the semiconductor light-emitting elements.

Embodiment of the present invention have been described in detail above. However, the present invention is not limited to the above Embodiment and may include various modifications. For example, the above Embodiment give the detailed descriptions of the vehicular lighting apparatus as a whole to help in understanding the present invention, and are not necessarily limited to the Embodiment including every constituent elements described above. Some of constituent elements of one embodiment may be replaced with constituent elements of another embodiment, and a constituent element of one embodiment may be added to a constituent element of another embodiment. Some of constituent elements of each embodiment may be deleted or replaced with other constituent elements or have other constituent elements added thereto.

EXPLANATION OF SYMBOL

101 . . . composite light; 1 . . . reflection mirror; 2-1,2-2 . . . light source; 3 . . . composite lens element (light guide element); 3-1,3-2,3-3 . . . diffraction granting; 3-4 . . . (V-shaped groove) reflection surface; 3-5 . . . light diffusion portion; 4 . . . lens; 5 . . . planar light source; 5-1,5-2 . . . composite light source; and 5-4 . . . light guide

The invention claimed is:

1. A vehicular lighting apparatus comprising:
a light-emitting unit that emits illumination light;
a light guide element made of a translucent material; and
an optical system that causes the light from the light-emitting unit to enter the light guide element,
wherein the light-emitting unit is configured by a plurality of light sources,
wherein the light guide element includes:
an incident face to transform the light from the light-emitting unit into a given shape by refraction action;
an inner wall light reflection surface that transforms the light into a given shape;

an emission face that emits the light reflected by the inner wall light reflection surface so as to have a predetermined light distribution property; and a V-shaped groove provided at one end face of the light guide element in the longitudinal direction thereof, the V-shaped groove having two inner surfaces, wherein a plurality of lens surfaces, a plurality of Fresnel lens, or diffraction gratings is formed on the incident face so as to line up in a longitudinal direction of the light guide element, wherein the light emitted from the plurality of light sources enters all of the plurality of lens surfaces, the plurality of Fresnel lens, or the diffraction gratings, and wherein a sum of lengths in a short direction of two portions separated by the V-shaped groove is smaller than a maximum value of a length in the short direction of a portion other than the two portions.

2. The vehicular lighting apparatus according to claim 1, wherein the light-emitting unit is composed of a plurality of white semiconductor light-emitting elements that emit white light and a plurality of red semiconductor light-emitting elements that emit red light, the white and red semiconductor light-emitting elements being arranged planarly.

3. The vehicular lighting apparatus according to claim 2, wherein the light-emitting unit is composed of the white semiconductor light-emitting elements and the red semiconductor light-emitting elements that are fewer than the white semiconductor light-emitting elements, the white and red semiconductor light-emitting elements being arranged planarly.

4. The vehicular lighting apparatus according to claim 3, wherein the white and red semiconductor light-emitting elements are arranged at random.

5. The vehicular lighting apparatus according to claim 3, wherein a plurality of light sources that emit beams of light different in color is attached to one end face in a longitudinal direction of the light guide element, and a V-shaped groove is provided between the plurality of light sources.

6. The vehicular lighting apparatus according to claim 1, wherein the light-emitting unit emits white light including near-infrared or infrared rays.

7. The vehicular lighting apparatus according to claim 6, wherein the light-emitting unit emits the white light and also emits near-infrared or infrared rays selectively.

8. The vehicular lighting apparatus according to claim 7, wherein when an infrared/near-infrared operated camera is used, the light-emitting unit emits the near-infrared rays or the infrared rays.

9. The vehicular lighting apparatus according to claim 1, wherein the plurality of lens surfaces, the plurality of Fresnel lens, or the plurality of diffraction gratings is formed integrally with the light guide element.

10. The vehicular lighting apparatus according to claim 1, wherein the number of the plurality of lens surfaces, the plurality of Fresnel lens, or the plurality of diffraction gratings is three, and wherein a central one of the plurality of lens surfaces, the plurality of Fresnel lens, or the plurality of diffraction gratings overlaps a part of each of two provided on both sides thereof.

* * * * *